(12) United States Patent
Curtis et al.

(10) Patent No.: US 11,429,273 B1
(45) Date of Patent: Aug. 30, 2022

(54) TOUCH-BASED TRACKING SYSTEM AND METHOD

(71) Applicant: Government of the United States, as represented by the Secretary of the Air Force, Wright-Patterson AFB, OH (US)

(72) Inventors: Jess Willard Curtis, Shalimar, FL (US); Emily Doucette, Fort Walton Beach, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 642 days.

(21) Appl. No.: 15/985,752

(22) Filed: May 22, 2018

Related U.S. Application Data

(60) Provisional application No. 62/510,325, filed on May 24, 2017.

(51) Int. Cl.
*G06F 3/04883* (2022.01)
*G06F 3/04847* (2022.01)

(52) U.S. Cl.
CPC ...... *G06F 3/04883* (2013.01); *G06F 3/04847* (2013.01); *G06F 2203/04808* (2013.01)

(58) Field of Classification Search
CPC ............. G06F 3/04883; G06F 3/04847; G06F 2203/04808
See application file for complete search history.

(56) References Cited

U.S. PATENT DOCUMENTS 8,639,396 B1 * 1/2014 Hirsch ................. G08G 5/0008
244/76 R
2017/0329412 A1 * 11/2017 Schwesig ............... G06F 3/017

OTHER PUBLICATIONS

Mehta, S. S. et al. "A Touch Interface for Soft Data Modeling in Bayesian Estimation" Oct. 2014 IEEE p. 3732-3737 (Year: 2014).*
Dani, Ashwin et al. "Information Fusion in Human-Robot Collaboration using Neural Network Represtation" Oct. 2014 IEEE p. 2114-21120 (Year: 2014).*
Mehta, S. S. et al. "A Touch interface for Soft Data Modeling in Baysian Estimation" Oct. 2014 IEEE p. 3732-3737 (Year: 2014).*

* cited by examiner

*Primary Examiner* — Stephen S Hong
*Assistant Examiner* — Nicholas Hasty
(74) *Attorney, Agent, or Firm* — AFMCLO/JAZ; Timothy M. Barlow

(57) ABSTRACT

A touch-based tracking method comprises starting a GUI which displays an environment; observing at least one of the presence or absence of one or more targets in relation to features in the environment; when an observation is made, reporting the observation through the GUI to form an input; reporting the observation in the GUI with a hand gesture; applying an algorithm to convert the input into a probability distribution; and updating a target state estimate and alters the environment display. The environment may be an area or a map, and the map may include a plurality of features, e.g. roads, building structures, forest, and water. The observation indicates the presence or non-presence of the one or more targets. The hand gesture is made on the map, such as a swiping motion with one or more fingers on the GUI, wherein the hand gesture indicates the strength of the observation.

3 Claims, 7 Drawing Sheets

(5 of 7 Drawing Sheet(s) Filed in Color)

50

TOUCH-BASED TRACKING SYSTEM AND METHOD

Pursuant to 37 C.F.R. § 1.78(a)(4), this application claims the benefit of and priority to prior filed Provisional Application Ser. No. 62/510,325, filed 24 May 2017, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to tracking systems and, more particularly, to tracking systems which utilize a variety of inputs and Bayesian probability algorithm.

BACKGROUND OF THE INVENTION

Target tracking in an unobstructed area such as air, sea and open landscape is well understood and is a relatively well established art. Hard data input from information sources such as cameras or other sensors are used and are frequently sufficient and reliable. Target determination and tracking in a complex environment having multiple obstructions, features, or obstacles, e.g. an urban environment, poses a different set of challenges. Currently, tracking in an urban environment includes communication of human observations via radios, and requires the ability to "see" and understand the entire target area. Urban, "busy", or other complex areas present issues such as buildings of various sizes, moving people, moving vehicles, and a mixture of materials that may or may not allow the penetration of radio signals. Line of sight is frequently obstructed and can lead to the inability to obtain and analyze the whole target scenario. Human observation and input is absolutely necessary in these environments but the fusion and integration of hard data and soft data is a difficult issue. The output of the combined data in a readable usable format is also an issue.

SUMMARY OF THE INVENTION

The present invention overcomes the foregoing problems and other shortcomings, drawbacks, and challenges of tracking targets in busy or complex environments. While the invention will be described in connection with certain embodiments, it will be understood that the invention is not limited to these embodiments. To the contrary, this invention includes all alternatives, modifications, and equivalents as may be included within the spirit and scope of the present invention.

The system fuses information from human sources (soft data) with information from automated sensors or machines (hard data) in a manner that autonomous agents or other humans can easily comprehend, and that is flexible as to a wide variety of target types, environments, and human variability.

According to one embodiment of the present invention, a touch-based tracking method comprises: starting a GUI which displays an environment; observing at least one of the presence or absence of one or more targets in relation to features in the environment; when an observation is made, reporting the observation through the GUI to form an input; reporting the observation in the GUI with a hand gesture; applying an algorithm to convert the input into a probability distribution; and updating a target state estimate and alters the environment display.

According to a first variation of the invention, the environment is an area or a map.

According to another variation of the invention, the map includes a plurality of features.

According to a further variation of the invention, the plurality of features of the map includes at least one of roads, building structures, forest, and water.

According to another variation of the invention, the observation indicates the presence or non-presence of the one or more targets.

According to a further variation of the invention, the method further comprises selecting the type of report to be made.

According to another variation of the invention, the type of report is selected from detection reports and or non-detection reports.

According to a further variation of the invention, the hand gesture is made on the map.

According to another variation of the invention, the hand gesture is made by a swiping motion with one or more fingers on the GUI.

According to a further variation of the invention, the hand gesture indicates the strength of the observation.

According to another variation of the invention, the GUI is sensitive to the pressure of the swiping motion.

According to a further variation of the invention, the algorithm determines a probability of a location of the one or more targets using Bayes' Rule.

According to another variation of the invention, the step of updating a target state estimate includes observing the at least one of the presence or absence of the one or more targets in the environment and adjusting a particle distribution.

According to another embodiment of the invention, a predictive tracking method comprises: populating a filter with information regarding the likely location of a target with a plurality of particles, wherein each particle corresponds to a position estimate for the target; selecting a few particles in the filter that correspond to a best estimate of the target's location; and running a time-update equation of a Bayesian filter recursively forward in time N steps for each selected particle to derive path predictions of where these particles will evolve in the N time steps.

According to a further variation of the invention, the predictive tracking method further comprises combining two or more of the path predictions into average predicted trajectories.

According to another variation of the invention, the predictive tracking method further comprises: when there are a finite set of goal states corresponding to one of M locations, counting how many of the path predictions terminate in each of the M locations; dividing the number of path predictions terminating in the $i^{th}$ location by the total number of path predictions to yield an estimate of a current probability that the target's goal is the $i^{th}$ location.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention. The patent or application file contains at least one drawing executed in color. Copies of this patent or patent application publication with color drawing(s) will be provided by the Office upon request and payment of the necessary fee.

Figure 1:
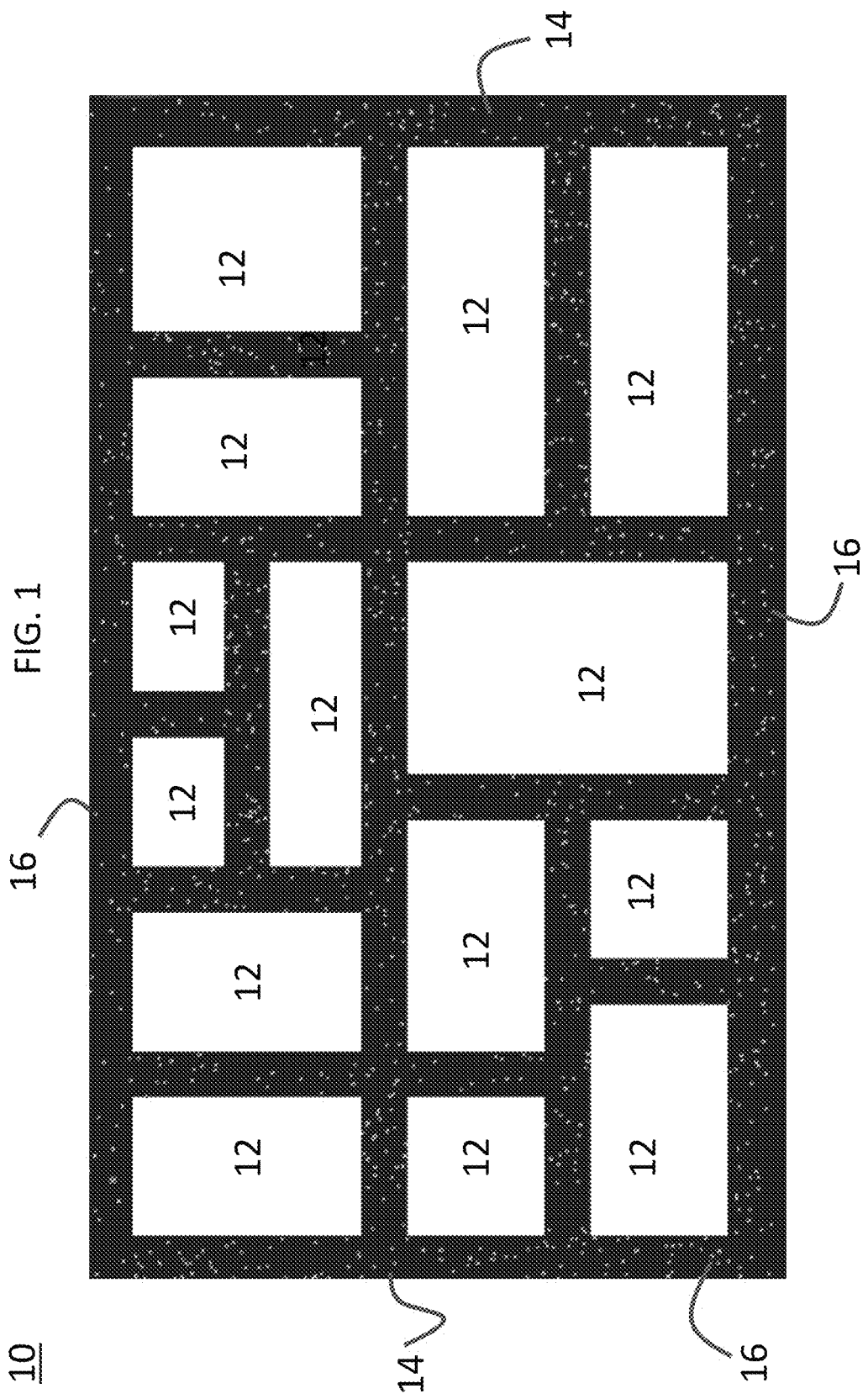
FIG. 1 illustrates a map with a uniform particle distribution, before target information is input.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The invention is a method for integrating human and non-human sensor data using a particle filter (within a Bayesian mathematical framework) to determine the probability of the location of a targeted object.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

The touch-based tracking system combines hard data gathered from non-human sources (such as electro-optic or infrared surveillance cameras, RF or acoustic area sensors, vehicles, and a priori known information such as predetermined maps) with soft qualitative data from human observers. This is done using a touch interface to transform soft information into a mathematical expression that can be integrated with hard data and presented in a natural way for human perception. It flexibly allows encoding a large class of informational observations and perceptions using single, multiple, and directional finger strokes. The system allows for real time communication and sharing of data between users that does not rely on a shared operational understanding nor upon any verbal communication. The system is implemented using touch screen electronic devices such as telephones, tablets, laptops, or other touch enabled devices. The current prototypes accept sensor data as a binary detection (i.e. the sensor either detects a target in its field of view or not). The underlying algorithm and mathematical framework is not limited to this class of measurement: a radar system that tells the direction of the target or its range or its velocity etc. could also input data. All of these sensor modalities could be implemented. The only true requirement is that a statistical model of the sensor is available (i.e. knowledge of its false alarm rate, its standard errors, error covariance matrix, etc.).

The particle filter (Bayesian) framework then combines the hard and soft data into information that can be read and understood by humans.

A Markov version of a discrete-time version of the Fokker-Planck equation (below) may be used to account for the passage of time (Time-Update). Because of the Markov assumption, the probability of the current true state given the immediately previous one is conditionally independent of the other earlier states.

$$p(x_k|x_{k-1},x_{k-2},\ldots,x_0)=p(x_k|x_{k-1})$$

Similarly, the measurement at the k-th timestep is dependent only upon the current state, so is conditionally independent of all other states given the current state.

$$p(z_k|x_k,x_{k-1},\ldots x_0)=p(z_k|x_k)$$

Using these assumptions the probability distribution over all states of the HMM can be written simply as:

$$p(x_0,\ldots,x_k,z_1,\ldots,z_k)=p(x_0)\Pi_{i=1}^{k}p(z_i|x_i)p(x_i|x_{i-1})$$

However, when using the Kalman filter to estimate the state x, the probability distribution of interest is associated with the current states conditioned on the measurements up to the current timestep. (This is achieved by marginalizing out the previous states and dividing by the probability of the measurement set.)

This leads to the predict and update steps of the Kalman filter written probabilistically. The probability distribution associated with the predicted state is the sum (integral) of the products of the probability distribution associated with the transition from the (k−1)-th timestep to the k-th and the probability distribution associated with the previous state, over all possible $X_{k-1}$.

$$p(x_k|z_{1:k-1})=\int p(x_k|x_{k-1})p(x_{k-1}|z_{1:k-1})dx_{k-1}$$

The probability distribution of update is proportional to the product of the measurement likelihood and the predicted state.

$$p(x_k|z_{1:k})=p(z_k|x_k)p(x_k|z_{1:k-1})p(z_k|z_{1:k-1})$$

The denominator $$p(z_k|z_{1:k-1})=\int p(z_k|x_k)p(x_k|z_{1:k-1})dx_k$$

is constant relative to x, so we can always substitute it for a coefficient α, which can usually be ignored in practice. The numerator can be calculated and then simply normalized, since its integral must be unity.

The mathematical representation of the information is displayed on the screen in real time in one of two ways: as a collections of points, or as a color-coded heat map having dynamically-evolving clusters of points to show the probability of target location based on the totality of input from all information sources. A void of points (empty space) also provides information on areas that are likely to not contain the target.

A variation of the current design may include a pinch-to-zoom feature that dynamically changes the size of the map and automatically scales the size of the particles as needed, with little effort. Data that would appear to be unnecessary, such as a cluster of points that moves off of the edge of the map, may be kept and may be useful to show where a target may have exited the mapped area.

FIG. 1 depicts a map page 10 showing the environment and the particle filter before any data has been input regarding the location of the target. Before location information for the target is input, the map 10 may have a uniform particle distribution. The white spaces 12 may represent buildings or other features of the environment that are not able to be observed, or are inaccessible to the target, sensors, or observers. The black spaces 14 may represent streets, roads, or other paths which are under surveillance. The particles 16, i.e. the white dots in the black spaces 14, are used to represent the probability of the target being in a particular location in FIG. 1. No location data has been input in the illustration of FIG. 1, so the particles 16 are distributed evenly throughout the black space 14.

The mapping or original screen underlay may be something as simple as a map downloaded from GoogleMaps™ or it can be a customized scenario that is drawn and uploaded, e.g. a building map. The underlying map may be imported from a service such as "Open Street Maps" and loaded as a network of roads. In this example, the software may be instructed that the particles will populate only the roads on this map if the target is a large wheeled vehicle, for example, because off-road travel would be highly unlikely. In a rural example, a topographic or other map may be imported showing elevation or terrain. For optimum accuracy, the statistical model of how a particular target moves on the features of that particular map (off-road on sand, dirt, mud, grass vs. on-road) should also be provided (e.g. a motion model that describes how fast the target can turn, move, etc. for each type of terrain (i.e. grass, forest, water, etc.). Alternatively, a blank screen (not shown) may be used to represent an entire area to be analyzed.

There are at least two distinct methods for converting a user's finger swipes on the touchpad into likelihood functions. In the first embodiment, the set of pixels touched in the swipe is identified. This set of pixels then becomes a plateau-shaped likelihood function, where the height of the plateau is specified by the user. The height of the plateau is defined by either the pressure of the finger swipe or through a slider bar or other element on the user interface.

According to the second embodiment, the finger swipe is like a virtual spray-paint can: as the finger is sliding along the interface the point of contact is randomly depositing virtual pixels of paint near the center of the finger's point of contact. Accordingly, at the end of the swipe there is a cloud of "painted" pixels stored in memory. The pressure of the stroke may be used to define how many "painted" pixels a given stroke produces. The cloud of "painted" pixels is then smeared, i.e. distributed, (mathematically, the "painted" pixels are convolved with a smoothing function). Another way to perform this would be to run the cloud of "painted" pixels through a spatial low-pass filter. After this, we have a smooth likelihood function.

In both cases the method yields a well-defined likelihood function that can then be mathematically incorporated into the Bayesian (particle) filter to produce an updated estimate of target state.

Figure 2:
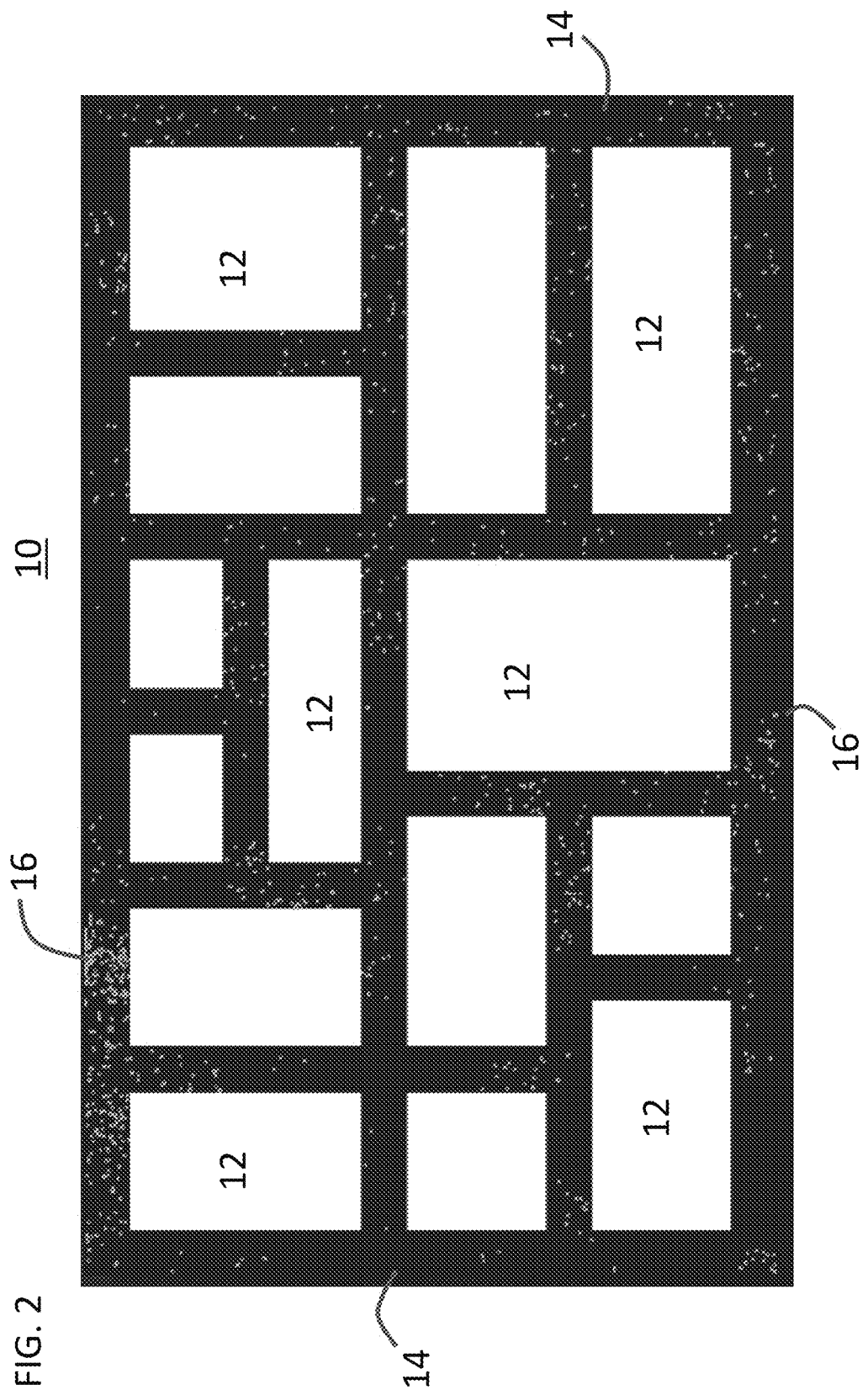
FIG. 2 illustrates the map of FIG. 1 with an uneven particle distribution, corresponding to a combination of negative information and positive information for the target.

FIG. 2 depicts the same environment as FIG. 1, except that data has been input regarding the target. A large number of the particles 16 are clustered near the upper left corner of the map 10 to display the probable location of a target based on fused hard and soft data. The particles 16 are no longer distributed uniformly across the map 10 as in FIG. 1, but are starting to gather in a distribution in the upper left corner in response to one or more detection reports of the target in that area. The detection reports may be a combination of negative information and positive information for the target.

Figure 3:
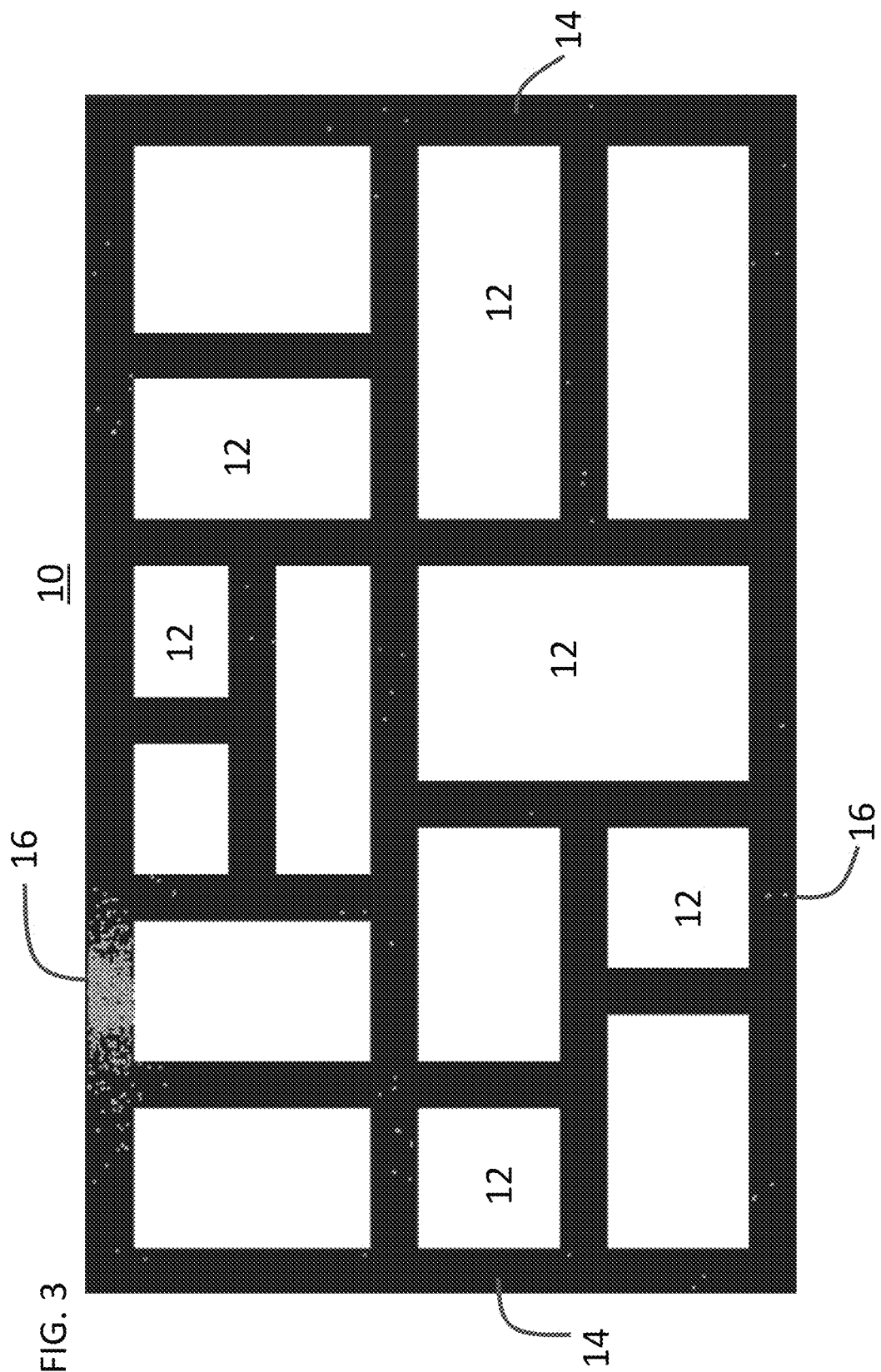
FIG. 3 illustrates the map of FIG. 1 with a highly-uneven particle distribution, corresponding to a strong likelihood of the target's presence at the greatest concentration of particles.

FIG. 3 illustrates the map of FIG. 1 with a highly-uneven particle distribution, corresponding to a strong likelihood or probability of the target's presence at or near the greatest concentration of particles in the upper left corner of the map 10. Notice that this strong probability may not be absolute certainty. That is, there are a few particles 16 still distributed elsewhere in the map 10 to account for the very small probability of the target being elsewhere.

Figure 4:
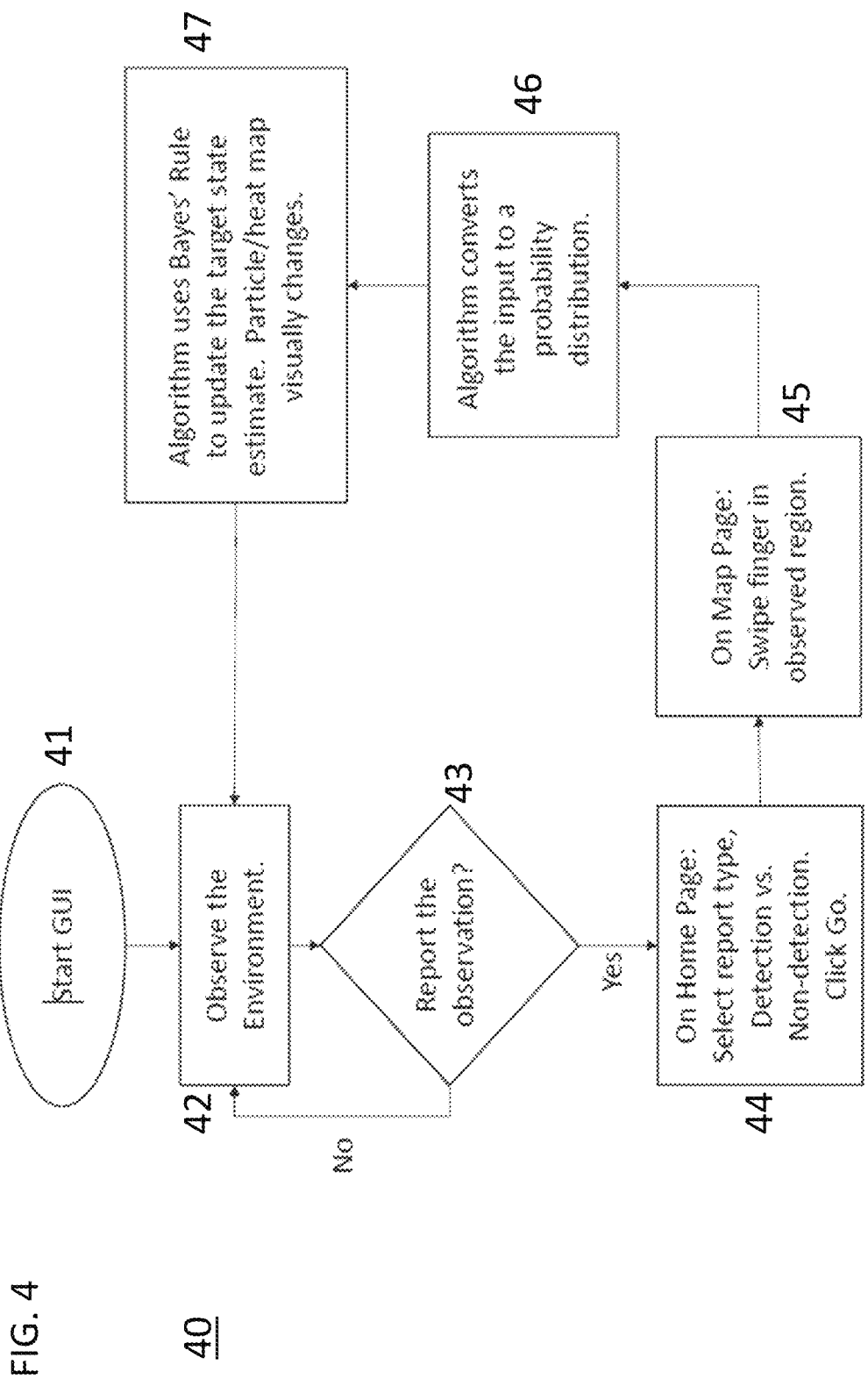
FIG. 4 presents a flow chart of the touch-based tracking method.

FIG. 4 presents a flow chart 40 of the touch-based tracking method. The process starts 41 when the user starts the GUI (graphical user interface). The GUI may be used not only to define the particular area or map 10 to be used, but also numerous other attributes pertaining to the display, the map, or the target. The GUI may be an interface on a smartphone, tablet, or other electronic device, and a partial sample of a GUI is presented in FIG. 5, and described below. Next, the user and/or autonomous systems observe 42 the environment to assess the presence (or absence) of one or more targets in relation to features on the map 10. In response to such observations, the user and/or autonomous system reports 43 the observation into the system through the GUI. If there are no reports to be made, the system will continue making observations 42. When an observation yields information to report, the user selects 44 the type of report to be made, e.g. detection (presence of target) or non-detection (absence of target), and the user makes a gesture 45 on the map 10 with a hand, e.g. swiping with one or more fingers, in a manner to indicate the strength of the observation, e.g. heavy or light swiping pressure. The system then uses an algorithm to convert 46 the inputs into a probability distribution, e.g. using Bayes' Rule, and the system updates 47 a target state estimate and alters the map 10 display accordingly. The system then returns to observing 42 the environment for further iterations.

Figure 5:
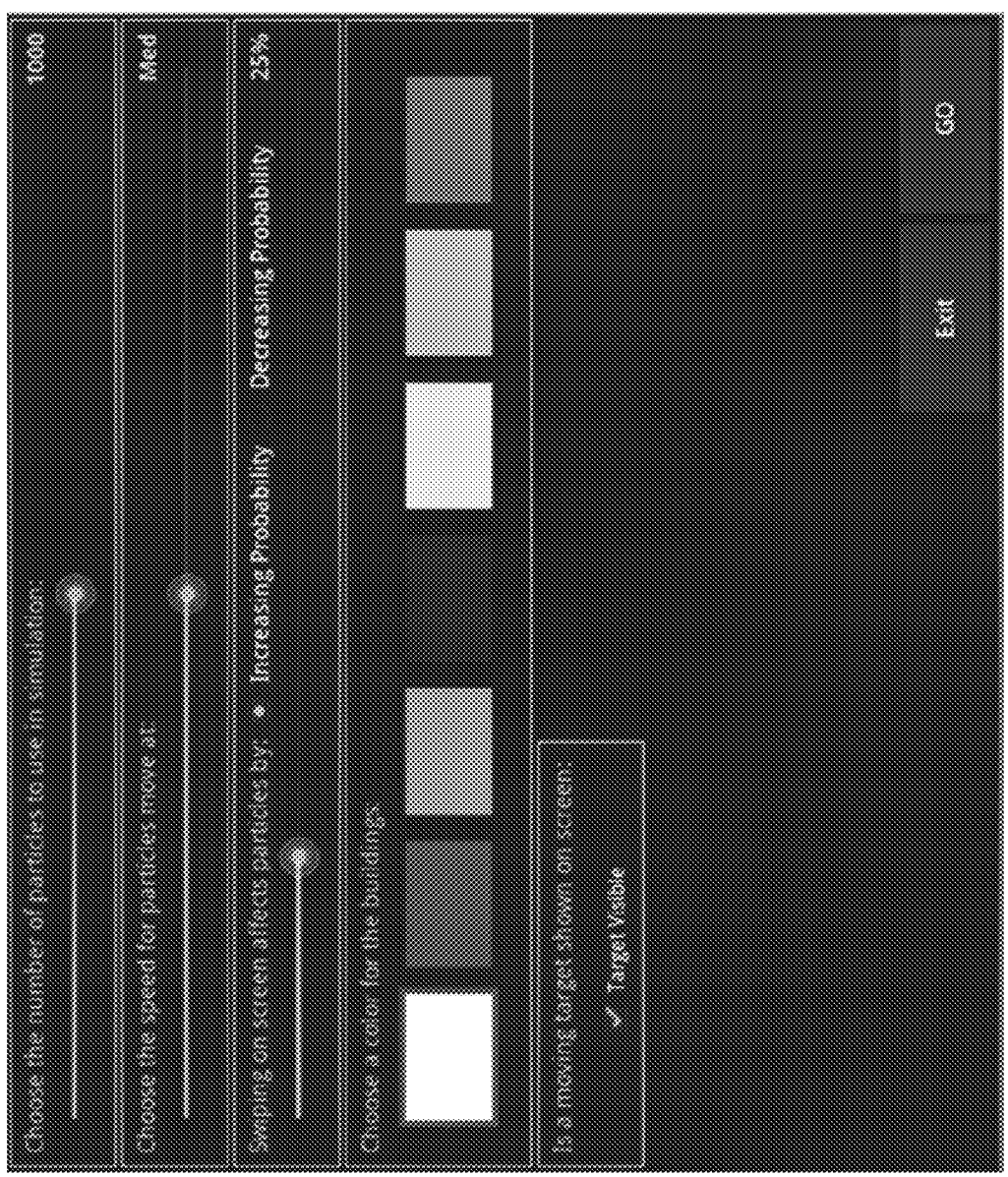
FIG. 5 illustrates an embodiment of an interface for a touch-based tracking system.

FIG. 5 illustrates an embodiment of an interface 50 for a touch-based tracking system. The interface 50 may be used to set up the map 10 according to user preferences, or according to a pre-coordinated scheme when many users are contributing to target observations. Such parameters may include the number of particles used to estimate the target location and to display on the map 10, the speed at which the particles move as appropriate for the likely velocity of the target, how swiping inputs will be interpreted by the algorithm (e.g. how much influence a particular human input will have on the total filtered estimate of target location), colors of buildings and/or other environmental features displayed on the map 10, whether the target is moving or stationary, how likely the target is to turn at intersections, types of terrain that the target is able to traverse (road only, non-water, all outdoor, etc.), and numerous other attributes that define how the target is able move and how likely the target is move in certain patterns.

One aspect of the invention relates to the input of data. Automatic or autonomous sensors may be used to collect information. In addition, data may be input by human agents. Each have its own advantages and disadvantages. The autonomous sensors are useful because they never tire, and will observe continuously until instructed to stop. Such autonomous sensors may be relatively inexpensive such that many sensors may be placed in the desired environment to make observations, within the limits of their programming. On the other hand, such autonomous sensors may be limited by their programming, and may not appreciate finer distinctions in target behavior, which may lead to misinterpreting target behavior. When human sensors are used, they may provide the advantage of flexibility and intuition, such that subtle clues provided by a target may be perceived more readily. On the other hand, humans may become distracted or tired, which may lead to lapses in coverage. However, when human observations are made, the system provides a streamlined way to input the data for quick and accurate interpretation.

Human inputs via touch screen manipulation may vary depending on the situation and need/requirements. The software may take into account factors such as number of fingers in a swipe, the amount of pressure of the finger touch, the speed of the swipes, and the software may translate those factors into confidence level, likelihood of accuracy, threat level, or other information such as what was sighted (i.e. vehicle, person, road block, etc.). Individual users' human factors can be programmed to allow for norms, habits, and preferences such as typical swipe pressure and swipe speed like that programed into a typical vehicle fob, enabling preset settings for each user. This would encourage all users' inputs to be considered equally by the software. This would also allow users to set their confidence level based on pressure or speed of swipes or taps, etc.

A particle filter may be used to represent an uncertain target location in an urban of congested environment. The inventive system and method enables human-generated 'soft information' to be fused with the target state estimation filter in a statistically-correct manner. Human operators may manipulate, via touch, the underlying samples by implementing a Bayesian measurement update. The parameters may be tuned in real time by via a menu on the touch-interface device itself. This allows flexible incorporation of data ranging from very uncertain target cues up to absolutely certain information. In addition, multiple touch inputs may be chained together to 'paint in' very subtle gradations of informational accuracy or human operator/agent belief.

Humans in the environment can provide "soft" information which is qualitative information that can be used to improve quantitative information.

Examples: "The car is on Main Street, heading east", or "I don't see the target at this intersection".

Such information is valuable because humans are typically better at recognizing and classifying targets than autonomous systems. The particle filter framework may incorporate soft information to indicate the likelihood or probability of a target being in a particular area, or being absent from a particular area.

The system may be utilized in a number of different ways. Overall, the system and software may be utilized in numerous disciplines in various problem scenarios where it is desired that the probability of an object of interest being in a particular area is updated based on information from various sources, including humans and autonomous systems. The critical requirements needed to apply this framework to a new problem is a map of the physical environment, a mathematical motion model for the object to be tracked/located, and a probabilistic model for any type of sensory information that is to be accepted by this framework. Specific application examples are presented below, along with the information that would be required:

1. Agriculture: The system and software could be used to determine when crops should be harvested, treated for a disease, or fertilized. A model of these various rules may be included in the software, and humans may update it with real time information based on recent weather patterns, insect populations, etc.

Software Update Required

Crop management: The additional information required to accomplish this would be average growth times for plants, a map of the crops, and reported information from human observers.

Disease monitoring: The additional information required to accomplish this would be average disease cycle (when it appears, what are the symptoms), what are the treatments, a map of the crops, and reported information from human observers.

Nutrition/fertilization: The additional information required to accomplish this would be average fertilization cycles for each type of crop, what are the dosages, a map of the crops, and reported information from human observers.

2. Safety and Law Enforcement: The system and software could be used to gather information from bulletins sent out for crimes in progress, amber alerts, amusement park location, lost persons (including children and at-risk adults). A central command station would view a map of the environment. An alert with a description of the individual and/or transport vehicle would be sent to all smart phones in the area, as is current practice. Observers could report a detection on their phones, and depending on the mode of transportation (car vs. on foot) and any real world information (list of possible destinations) the software could be used to predict where the missing person will likely be at any time in the future.

Software Update Required

Minimal update would be required to accommodate this, other than adding the capability for the software to consider a list of possible destinations in the weighting of future probabilities.

3. First responders: This software could be used to inform first responders of the probable location of wildfires, oil following a spill, individuals trapped in houses due to fire/natural disasters, and general search and rescue on land and at sea.

Software Update Required

First responders could carry tablet/touch interface devices to report detections and non-detections of the item of interest. This information could then be aggregated into a single representation at the central command station. Models of fire propagation and tidal patterns would be necessary to track forest fire progress and oil spills.

4. Marketing research: This concept could be used to inform advertising professionals where and when it is best to place certain types of advertisement based on customer tracking, shopping behaviors, purchase patterns, and predictive analysis.

Software Update Required

This application would take a significant amount of expert input to capture the human trends such as when certain groups of people would be interested in purchasing certain items. Traveler migration trends could be leveraged to advertise to groups of people, such as advertising outdoor activities along the highway towards the beach during spring and summer vacation times. In addition, if human observer employees provided data on a group of pedestrians in a theme park that passed by, restauranteurs and shopkeepers could tailor their outdoor marketing based on the group's probable path through the park. This application would heavily leverage the probabilistic nature of this software.

5. Industrial Inventory Management: Similar to crop management, inventory could be managed by this software provided a model of inventory needs including the production schedule and parts required for each production line.

Software Update Required

Plant workers could report via touch interface when a piece of inventoried stock has been used, and a replacement order time could be suggested to procurement personnel by the software based on the production schedule and known/average lead time to reorder each item.

6. Medical: Similar to market research, applying this software to identifying medical conditions or the progression of diseases would require significant information/models from experts in the field regarding how to develop the probabilistic representation of how information from certain sensors and tests influence the probability of a patient having a certain disease.

The invention includes numerous new features, including:

1. Using pressure sensitivity in the touch interface as a way of encoding the certainty (and thus the mathematical influence) associated with a particular human-generated measurement/observation.

2. Encoding "negative measurements" with a touch interface (meaning an observation indicating the absence of a detection/measurement/perception, e.g. an observer is watching a stretch of road and doesn't see a target vehicle on the road. Though negative information, it is still useful information. Our system permits such information to be encoded through the touch interface and combined in the Bayesian filter.

3. Using a stylus or button or other device to quickly switch between a positive measurement and a negative measurement. This could be a finger-based touch-screen or it could be a stylus-based or other pressure-sensitive hardware interface.

4. The overall system may include some or all of the following parts:

a. Pressure-sensitive tablets carried by one or more human operators;

b. one or more automated (non-human) sensors in the environment;

c. the wireless network that shares the touch-strokes and particle-filter estimates between these tables and the automated sensors;

d. (optionally) one or more information fusion "hubs" (computers) that are on this network and that take all of the information from both humans and automated sensors and use a Bayesian filter to combine it all and broadcast out a "fused" probability density function that incorporates all the information.

6. Methods for accommodating delayed information, such as observations from observers that arrive late due to digital communication bandwidth constraints, or observations or reports from multiple observers that arrive out of sequence.

7. Methods for recognizing when one or more of the sensors or humans may be compromised (hacked, spoofed, etc.) or may be adversarial, and then for removing the effects of their compromised measurements and observations.

8. Methods for using this system to predict the future path and state of the system being observed, and for displaying these predictions on the tablet or device with a collection of branching lines or curves whose color and or transparency reflect the probability of the corresponding path prediction Methods for using this system to predict the likely goal state or goal location of the target, possible from among a pre-specified set of possible goals, and a method for graphically displaying this goal state prediction on the tablet or display device via symbols placed at the likely goal states or positions, where the symbols' color or transparency are used to reflect their corresponding likelihood.

Figure 6:
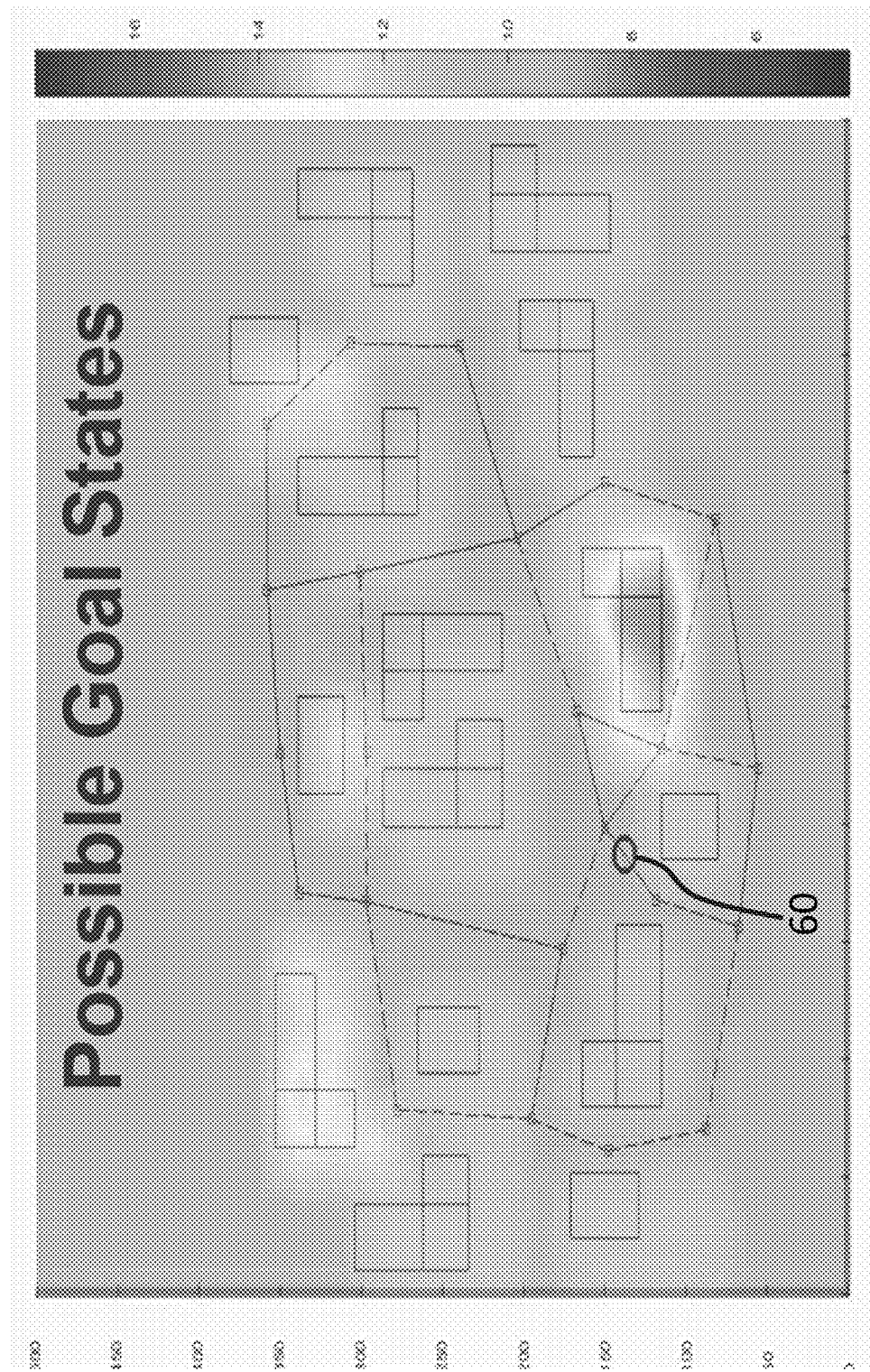
FIG. 6 illustrates possible goal states corresponding to an embodiment of the disclosed method.

FIG. 6 illustrates possible goal states corresponding to an embodiment of the disclosed method. The dark circle 60 represents the system's best estimate of the target's current state. The best estimate may be determined in various ways. For example, it may be the sample mean, i.e. take the spatial average of all the particles in the filter and draw the circle at that location, or the largest mode, i.e. this may be calculated with a clustering algorithm such as K-MEANS or by smoothing out the particles via a spatial low pass filter and then selecting the largest value on the resulting density function.

The heat-map-style color gradient in the background of FIG. 6 represents where the target is likely going in the future, i.e. the goal state of the target. Hotter colors, e.g. red, orange, yellow, may be used to represent high probability goals, e.g. buildings or other locations toward which the target is likely moving. Cooler colors, e.g. blues, may be used to represent unlikely destinations for the particular target being tracked.

Figure 7:
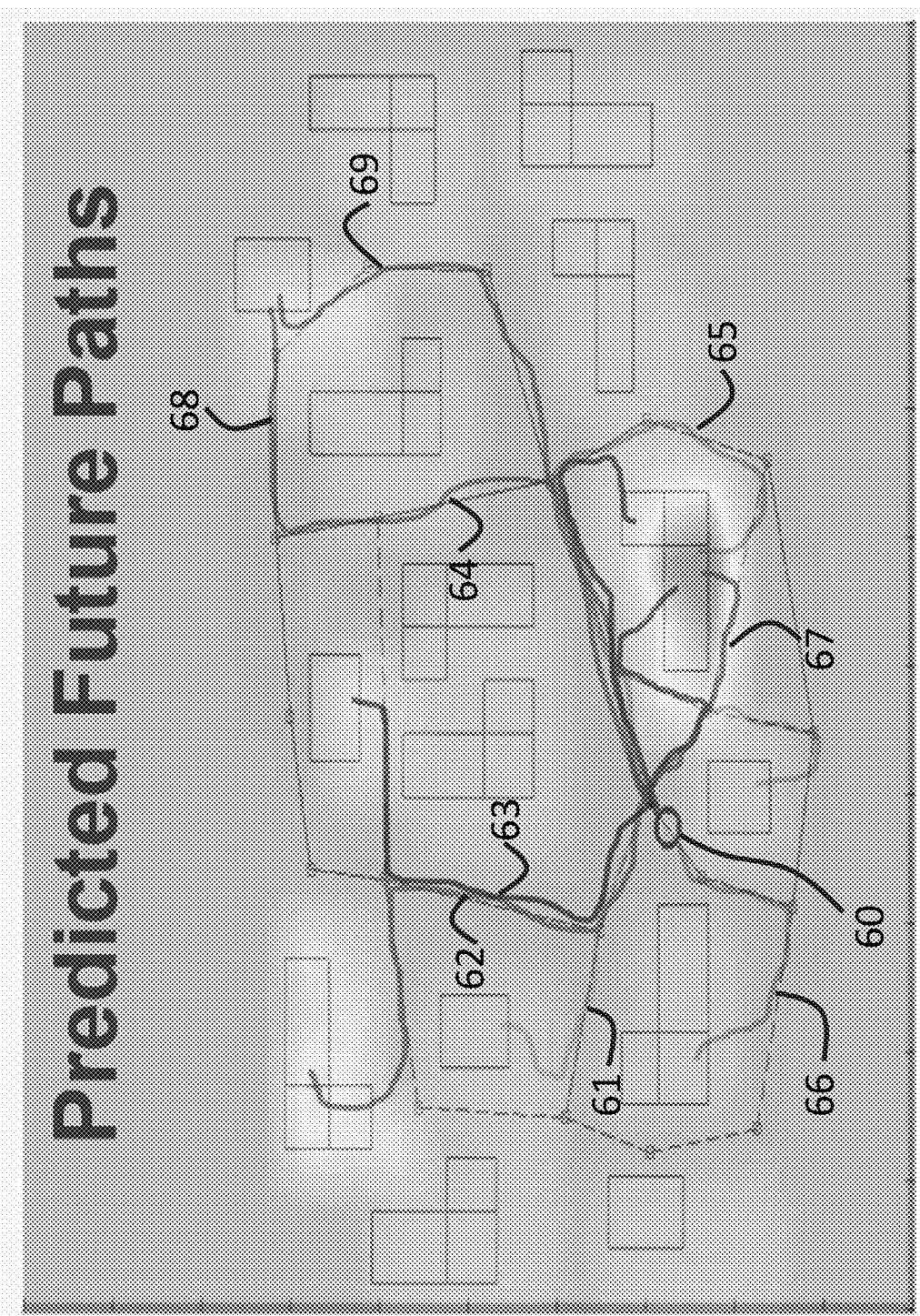
FIG. 7 illustrates predicted future paths corresponding to an embodiment of the disclosed method.

FIG. 7 illustrates predicted future paths for the environment illustrated in FIG. 6, corresponding to an embodiment of the disclosed method. The dark circle 60 represents the best estimate (e.g. the mean, or the mode of the current probability density function) of the target's current/present-time location or state. The heat-map style color gradient in the background of FIG. 7 represents where the target is likely going in the future, i.e. the goal state of the target. Hotter colors, e.g. red, orange, yellow, may be used to represent high probability goals, e.g. buildings or other locations toward which the target is likely moving. Cooler colors, e.g. blues, may be used to represent unlikely destinations for the target being tracked. The squiggly lines, i.e. future target trajectories 61-69, emanating from the target's current state 60 illustrate predictions of where the target may move in the future. The color/transparency of these lines/curves 61-69 may be used to indicate the likelihood/probability corresponding to the future target trajectories.

The curves/lines 61-69 are generated to illustrate predicted possible future target trajectories, which requires that the prediction step of the Bayesian filter, i.e. the Time Update step of the particle filter, is run into the future repeatedly. The repeated running/execution of the Time Update step moves the particles forward in time based on the map and our a priori model of the target's dynamic/kinematic capabilities. In other words, from the perspective of a single particle in the filter, that particle is moved forward one step in time using the time-update equation, and then the time update equation is run again from that newly-predicted particle location to generate another predicted location, which results in the particle being presented two time steps into the future. The time update equation is repeated N times until a series of N future locations is generated for that particle. The result is a crooked 'bread-crumb trail' with N crumbs. This process is repeated for a plurality of particles, e.g. 3-100 particles, that are nearest to our current best estimate of the target's current location. Several particles nearest the largest clump of particles in the filter may be picked at the current time. When a large number of predictions are run on the chosen particles a large number of bread-crumb trails, i.e. predicted trajectories of the target, are generated. Based on the particular model of the target's dynamic/kinematic capabilities utilized, there may be some general paths that have many predicted-trajectory bread-crumb trails near them. These paths may be presented as brightly colored or totally opaque curves in FIG. 7 in order to emphasize the higher probability associated with those paths. Other paths (those having lower associated probabilities) may have only one or a small number of bread-crumb trails near them, and may be depicted as highly transparent or subtly-colored curves.

The disclosed method for the invention includes several steps:

(1) Identify and select a few particles in the current filter that are closest to the best estimate of target location, e.g. closest to the biggest mode or the sample mean.

(2) These few particles are run N steps forward in time by recursively applying the time-update (prediction) step of the Bayesian filter. This step produces path predictions of where these particles will evolve in the N time steps.

(3) The predicted paths may be clumped together into average predicted trajectories (via off-the-shelf cluster algorithms such as K-MEANS), where the number predictions in a clump is proportional to its probability. In the alternative, if there are a pre-defined or pre-known finite set of goal states, i.e. it is known a priori that the target is moving to one of M locations, the system counts how many of the path predictions terminate in each of the M locations. The number of path predictions terminating in the $i^{th}$ location divided by the total number of path predictions yields the estimate of the current probability that the target's goal is that $i^{th}$ location.

The embodiments herein may comprise a computer program product configured to include a pre-configured set of instructions, which when performed, may result in actions as stated in conjunction with the methods described above. In an example, the pre-configured set of instructions may be stored on a tangible non-transitory computer readable medium or a program storage device. In an example, the tangible non-transitory computer readable medium may be configured to include the set of instructions, which when performed by a device, may cause the device to perform acts similar to the ones described here. Embodiments herein may also include tangible and/or non-transitory computer-readable storage media for carrying or having computer executable instructions or data structures stored thereon.

Generally, program modules include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps. The embodiments herein may include both hardware and software elements. The embodiments that are implemented in software include but are not limited to, firmware, resident software, microcode, etc.

The techniques provided by the software-enabled embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chip may be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product may be any product that includes integrated circuit chips, ranging from toys and other low-end applications to advanced computer products having a display, a keyboard or other input device, and a central processor.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A predictive tracking method comprising:
 populating a filter with information regarding the likely location of a target with a plurality of particles, wherein each particle corresponds to a position estimate for the target;
 selecting a few particles in the filter that correspond to a best estimate of the target's location;
 running a time-update equation of a Bayesian filter recursively forward in time N steps for each selected particle to derive path predictions of where these particles will evolve in the N time steps.

2. The predictive tracking method of claim 1, further comprising:
   combining two or more of the path predictions into average predicted trajectories.

3. The predictive tracking method of claim 1, further comprising:
   when there are a finite set of goal states corresponding to one of M locations, counting how many of the path predictions terminate in each of the M locations;
   dividing the number of path predictions terminating in the $i^{th}$ location by the total number of path predictions to yield an estimate of a current probability that the target's goal is the $i^{th}$ location.

\* \* \* \* \*